United States Patent [19]
Olson

[11] Patent Number: 5,443,912
[45] Date of Patent: Aug. 22, 1995

[54] LAMINATED ENVIRONMENTAL PROTECTION LAYER FOR ACRYLIC AIRCRAFT WINDOWS

[75] Inventor: Jan B. Olson, Playa del Rey, Calif.

[73] Assignee: Sierracin Corporation, Sylmar, Calif.

[21] Appl. No.: 157,954

[22] Filed: Nov. 24, 1993

[51] Int. Cl.$^6$ .................. B32B 27/00; B60J 1/00; B64C 1/14
[52] U.S. Cl. .................. 428/425.6; 428/192; 428/213; 428/332; 428/423.1; 244/129.3; 156/99; 156/108; 156/153; 156/154
[58] Field of Search ............. 428/34, 425.6, 99, 213, 428/332, 423.1; 52/788, 790; 156/108, 99, 153, 154, 155; 296/84.1; 244/121, 129.3

[56] References Cited

U.S. PATENT DOCUMENTS

| | | | |
|---|---|---|---|
| 3,388,032 | 6/1968 | Saunders | 161/183 |
| 3,885,072 | 5/1975 | Zibritosky | 52/208 |
| 4,072,782 | 2/1978 | Kramer et al. | 428/409 |
| 4,073,986 | 2/1978 | Keslar et al. | 428/38 |
| 4,081,581 | 3/1978 | Littell, Jr. | 428/138 |
| 4,103,070 | 7/1978 | Ammons | 428/412 |
| 4,364,786 | 12/1982 | Smith, Jr. et al. | 156/99 |
| 4,504,341 | 3/1985 | Radzwill et al. | 156/102 |
| 4,645,146 | 2/1987 | Hall | 244/129.3 |
| 4,666,758 | 5/1987 | Hunter | 428/212 |
| 4,810,583 | 5/1989 | Brown et al. | 428/425.6 |
| 4,817,347 | 4/1989 | Hand et al. | 52/171 |
| 4,836,314 | 6/1989 | Rupprecht et al. | 177/210 |
| 4,855,260 | 8/1989 | Dumbaugh, Jr. et al. | 501/66 |
| 4,921,759 | 5/1990 | Orain et al. | 428/424.4 |
| 5,039,573 | 8/1991 | Bravet et al. | 428/423.1 |
| 5,047,272 | 9/1991 | Hassel et al. | 428/40 |

Primary Examiner—Donald J. Loney
Attorney, Agent, or Firm—Christie, Parker & Hale

[57] ABSTRACT

A laminated environmental protective layer for acrylic aircraft windows provides significant improvement in the performance of original production windows and in repair of damaged aircraft windows. A thin chemical and erosion resistant outer protective layer of environment resistant transparent material is laminated to the exterior acrylic surface of the aircraft window using a thin urethane interlayer. Use of chemically strengthened glass for the outer protective layer and hot processing of the laminate increases impact resistance. Addition of an inner balancing layer minimizes bowing of the processed window and enhances stiffness of the window and compression of the outer layer for additional impact resistance.

10 Claims, 3 Drawing Sheets

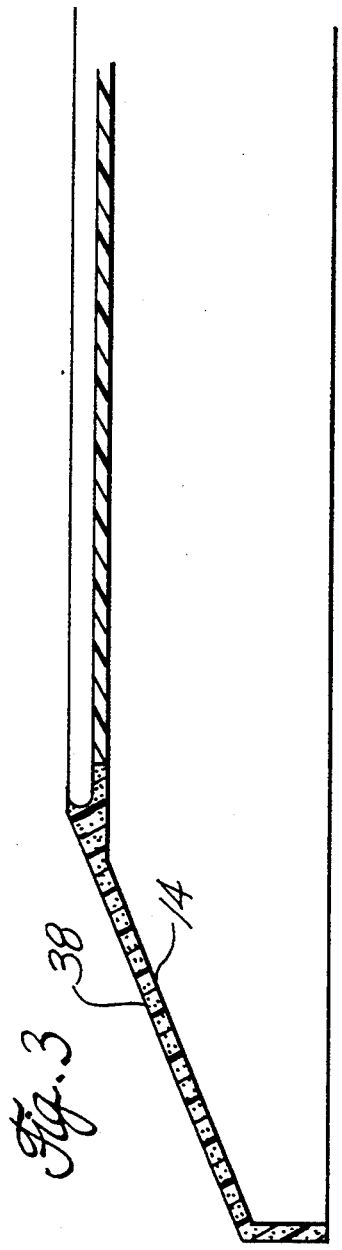
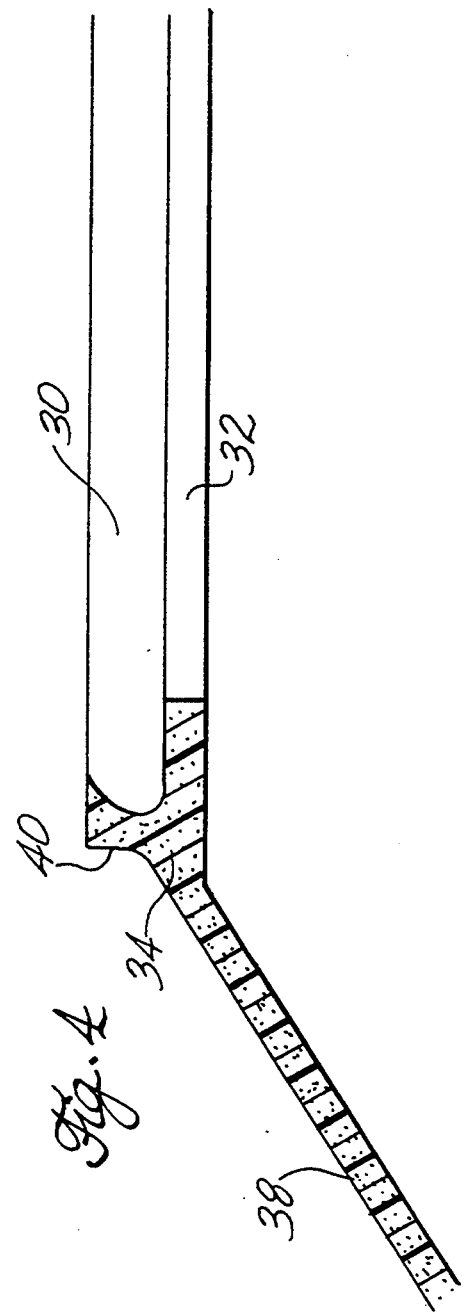

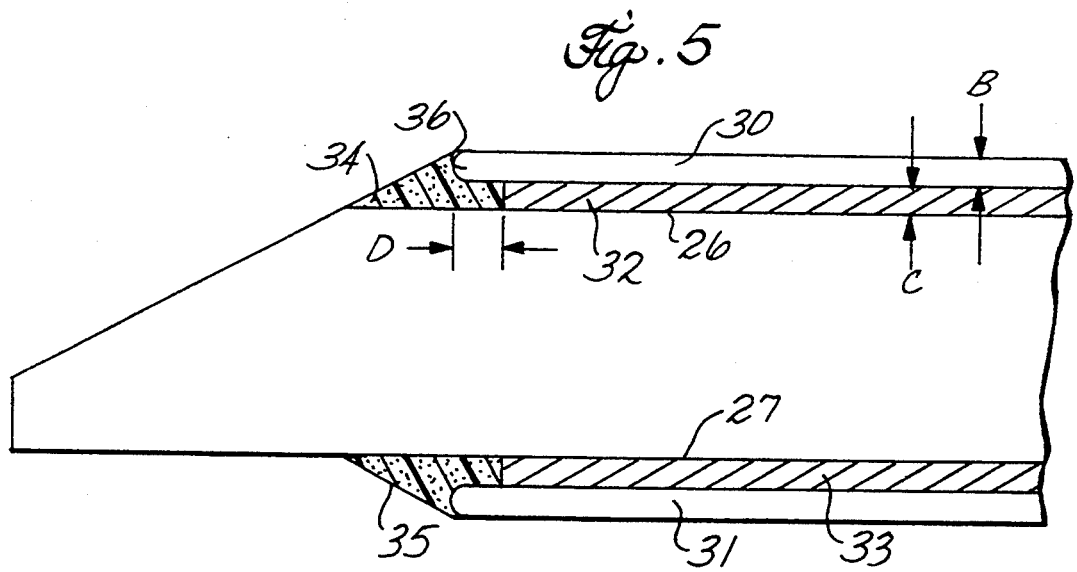
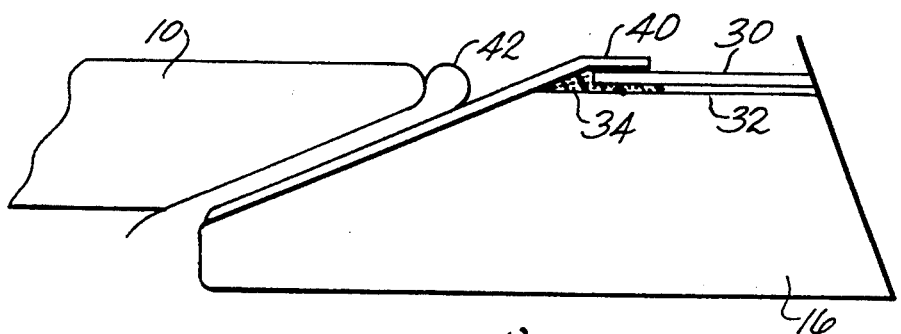
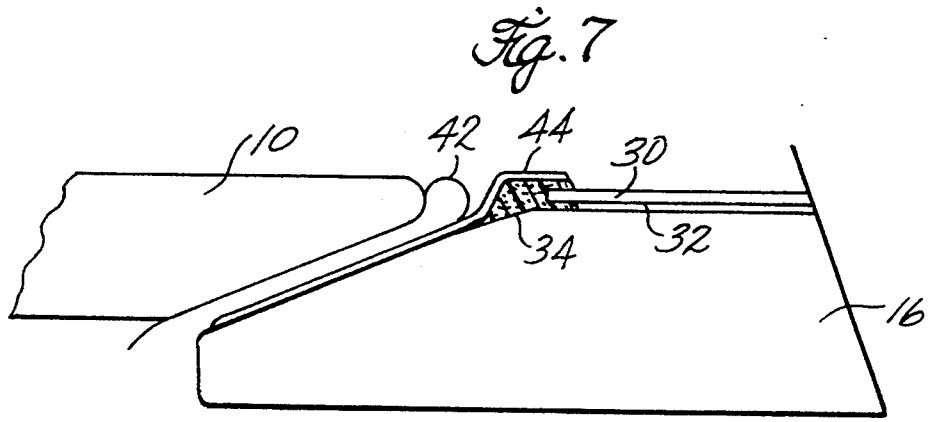

LAMINATED ENVIRONMENTAL PROTECTION LAYER FOR ACRYLIC AIRCRAFT WINDOWS

BACKGROUND OF THE INVENTION

1. Field of the Invention

The present invention relates to protection of aircraft windows having an acrylic outer surface from chemical attack, crazing, discoloration and impact erosion. More particularly, the present invention provides a thin chemical and erosion resistant outer protective layer of glass, highly cross-linked acrylic, or other environment-resistant transparent material laminated to the exterior acrylic surface of the aircraft window by a thin urethane interlayer.

2. Prior Art

Aircraft windows including cockpit side windows and cabin windows are typically fabricated using acrylic plastics in homogenous or laminated form or acrylic and glass laminated structures to meet weight and impact resistance requirements. In many of these window configurations, the external layer or surface comprises stretched acrylic plastic. Stretched acrylic provides a tough, reasonably durable finish, however, crazing, pitting, erosion and discoloration of the acrylic surface can be caused by particulates, hail and chemical attack. The toughness gained in stretching the acrylic reduces hardness thereby increasing the susceptibility to degradation.

In recent years a worsening problem with aircraft windows has been created by significant volcanic eruptions which not only introduce significant quantities of high particulate ash into the upper atmosphere but also create a corrosive chemical environment severely degrading acrylic aircraft windows. Severe degradation of cabin windows for commercial airline aircraft is exemplary of this problem. Most regular airline travelers can attest to the significant degradation of visual quality in aircraft windows. The windows are crazed and/or pitted, significantly impairing vision. Studies have indicated that chemical attack from volcanically introduced substances at higher altitudes is the major contributing cause to such crazing.

In prior industry practice, airline cabin windows were removed and the exterior surfaces were ground and polished to restore the visual quality of the windows. Typical aircraft window configurations such as those shown in FIGS. 1A and 1B of the drawings had initial representative thicknesses of approximately 0.350±0.015 inches with a minimum structural thickness requirement of 0.280 inches. This provided approximately 0.070 inches for grinding and polishing of the windows during refurbishment. This tolerancing allowed approximately three refurbishments of the window before reaching the minimum structural thickness. This machine grinding and polishing operation depends on flattening these relatively thin panes during the process using vacuum tooling or other means. The much thicker laminated cockpit side windows do not lend themselves to being flattened, so they are limited to less effective hand polishing and premature replacement if the surface damage is too deep to be removed in this manner.

Current atmospheric conditions are resulting in rapid degradation of windows and more frequent repair of the windows as described, which, along with more frequent replacement of aircraft windows due to increased frequency of repair, has created an extensive cost burden for commercial carriers. Consequently, modifications to original windows and a means to accomplish repair of acrylic aircraft windows to reduce damage and eliminate repetitive repair is sought.

SUMMARY OF THE INVENTION

The present invention provides a laminated outer protective layer for aircraft windows having an acrylic outer surface which may be employed on initial production or as a refurbishment for existing windows sustaining chemical attack or erosion damage. In the refurbishment case, the acrylic surface of the window is machined, if necessary, to accommodate the laminate and polished to the desired visual quality. Machining is less desirable on cockpit side windows which are often compound curved, and in this case the present invention provides a sufficiently small thickness addition that it can be tolerated without undo impact on aerodynamic smoothness, or the window can be displaced inward the requisite amount by selective shimming of the outer interfacial surface and removal of edge attachment material at the inner interfacial surface.

An outer protective layer comprising glass, or highly cross-linked acrylic polymer or other protective plastic, which are highly resistant to chemical attack and particulate erosion, having a thickness of less than about 0.050 inches, is laminated to the acrylic surface using a urethane interlayer having a thickness and adhesion sufficient to resist thermal stresses in the completed laminate, but thin enough to avoid excessive deflection of the outer protective layer for impact resistance. Glass thickness and interlayer thickness are therefore interrelated.

The periphery of the outer protective laminate with interlayer is faired, if necessary, with compatible sealant to enhance aerodynamics and avoid edge impact on the protective layer. The interlayer is dimensioned to provide a recess around the protective layer for enhanced sealant adherence and structural integrity.

BRIEF DESCRIPTION OF THE DRAWINGS

The present invention is better understood with reference to the accompanying drawings and detailed description wherein:

FIG. 3 is a cross-sectional view demonstrating a second embodiment of the present invention as incorporated on an aircraft cabin window with extended sealant coverage on machined surfaces of the window;

FIG. 4 is a cross-sectional view demonstrating a third embodiment of the present invention wherein a breakout point matching supporting structure for the window is created using the sealant to further enhance the aerodynamics of the installation;

FIG. 5 is a cross-sectional view demonstrating an alternative embodiment of the invention employing an inner balancing lamination;

FIG. 6 is a cross-sectional view demonstrating an embodiment of the present invention employing a blended Z-strip; and FIG. 7 is a cross-sectional view demonstrating an embodiment of the present invention employing an Island Z-strip.

DETAILED DESCRIPTION

Figure 1A:
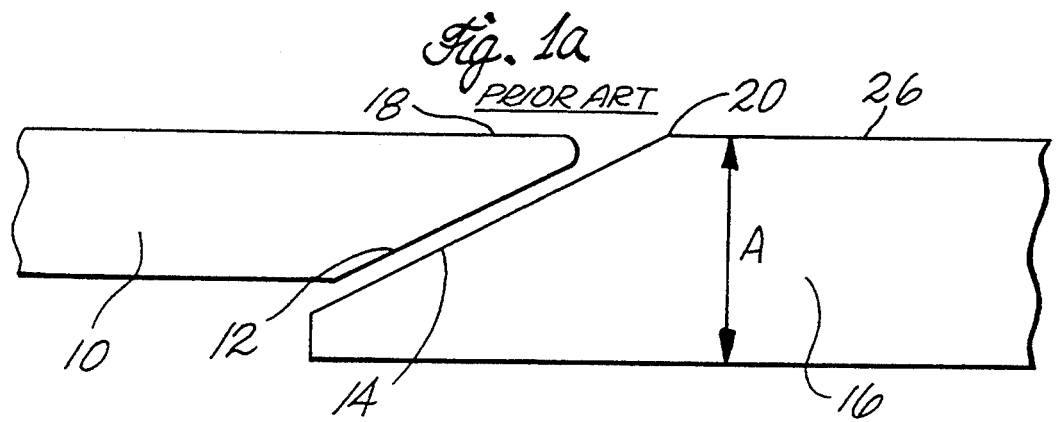
FIG. 1A and FIG. 1B demonstrate a cross-sectional view of configurations for existing commercial aircraft cabin windows as exemplary of windows on which the present invention may be employed.

Referring to the drawings, FIG. 1A shows a cross section of the basic structural arrangement of a commercial aircraft cabin window. The support structure 10 typically provides an angled sealing surface 12 which receives a mating sealing surface 14 of the cabin window 16. The interface of the structure to the window for this embodiment is ideally a knife edge, however, as shown in the drawings, actual dimensional limitations result in a blunt edge 18 with resulting mold line variation on the exterior aerodynamic surface of the fuselage. The cabin window and supporting structure constitute a portion of the pressure vessel created by the aircraft fuselage. In an exemplary configuration the structural requirements for integrity of the pressure vessel result in a window thickness, A, of $0.350 \pm 0.015$ inches. A minimum thickness of 0.280 inches provides tolerancing for repair of the window as will be described subsequently.

Figure 1B:
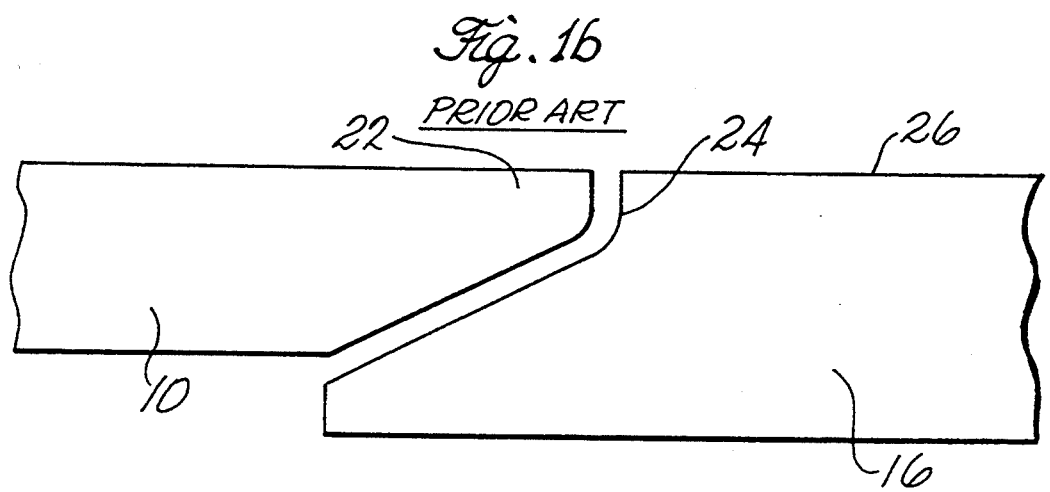

An alternative design of the window is shown in FIG. 1B wherein the knife edge 18 if FIG. 1A and the associated obtuse angle vertex 20 on the window are replaced by a breakout point arrangement wherein the structure employs a blunt nose 22 mating with the breakout point 24 on the window. The second embodiment relieves the dimensional constraints required in attempting to match the knife edge and vertex point to avoid aerodynamic irregularities in the assembled configuration.

Damage due to chemical attack, crazing, scratching, pitting or erosion of the exterior surface 26 of the window is repaired by grinding and polishing the exterior surface of the window to redeem the desired visual quality. In the configuration of FIG. 1A the amount of material machined from the external surface 26 must also be removed from the mating surface 14 to retain the exterior mold line and avoid aerodynamic imperfections. In the embodiment of FIG. 1B, while machining of the mating surface 14 may be required in addition to machining of the exterior surface the dimensional requirements are significantly relaxed due to the ability to shim the mating surfaces to achieve the desired mold line tolerance.

Figure 2:
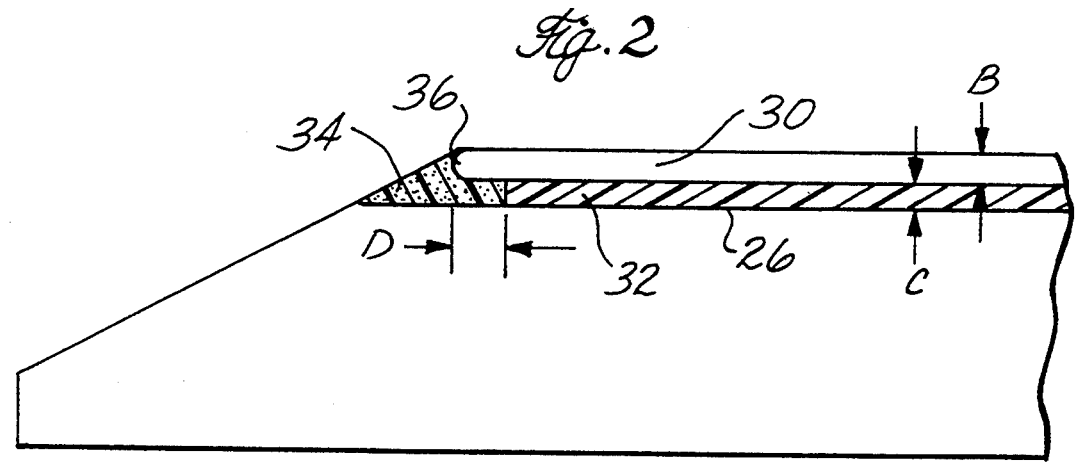
FIG. 2 is a cross-sectional view showing a first embodiment of the present invention as implemented on a commercial aircraft cabin window.

A first embodiment of the present invention is shown in FIG. 2. For refurbishment of a window with a damaged outer surface, the surface is machined down by approximately 0.050 inches from original tolerances to accommodate an erosion protection layer 30 and a urethane interlayer 32. For replacement of original production windows without impacting the overall design, the acrylic window is produced from a sheet having a reduced thickness of material. Present embodiments of the invention employ a 0.025 inch chemically strengthened soda lime glass outer protective layer laminated to the window surface with a 0.015 inch urethane interlayer. For window configurations without extreme compound contours, the initially flat glass outer protective layer is elastically formed for lamination to the exterior surface of the acrylic window. Employing the dimensions for the exemplary embodiment of the cabin window previously described, machining of the window from original tolerances to approximately $0.300 \pm 0.010$ inches, or for a new window, using reduced thickness sheet material of this dimension, accommodates the present invention within mold line tolerances. This structural thickness further allows sufficient margin over the minimum thickness for the window.

A seal 34 is created around the edge of the outer protective layer and urethane interlayer laminate to aerodynamically fair the laminate and protect the erosion layer from edge impact.

In the embodiment disclosed herein, the glass outer protective layer comprises a chemically strengthened soda lime float glass having a thickness, B, of 0.025 inches. The urethane interlayer comprises urethane sheet produced by Sierracin under part number S123 having a thickness, C, of 0.015 inch. The selected thickness of the urethane provides sufficient thickness, adhesion and shear strength to resist thermal stresses between the acrylic window and glass outer protective layer without delamination. The interlayer is sufficiently thin, however, to avoid excessive deflection of the glass for impact resistance. In the present embodiment, the glass is chemically strengthened providing a compression layer of approximately 0.001 to 0.002 inches. Thermal strengthening of the glass is not possible due to its lack of adequate thickness.

In a refinement to the basic process employed in creating the present laminate for the invention, the lamination of the glass outer protective layer to the acrylic window with the urethane interlayer is accomplished employing a hot lamination process. During hot processing, the acrylic has a significantly greater expansion than the glass outer protective layer. Consequently, upon cooling the glass layer is placed in compression causing the window laminate to bow slightly outward. The resulting configuration places the glass outer protective layer in complete compression throughout its thickness thereby enhancing the chemical strengthening of the glass and avoiding potential crack initiation from deep scratches penetrating the chemical compression layer thickness. This attribute can be varied beneficially with proper selection of lamination temperature and contour restraint. In the embodiment disclosed herein a processing time of approximately 2 hours at 180 degrees F. at a pressure of 75 psi has produced satisfactory results.

Excessive distortion and/or contour change is corrected by laminating in a flattened condition, such that final contour of the part is acceptable.

Windows in service in the aircraft typically acquire bowed shape during pressurization. The bowing effect created in the laminating process for the present invention does not exceed the tolerance allowable for window bow during pressurization and the added stiffness of the glass/acrylic laminate avoids exceeding the maximum allowable bow during pressurization.

FIG. 5 demonstrates yet a further refinement of the present invention which adds an inner balancing layer 31, of substantially the same thickness as the outer protective layer, bonded to the inner surface of the window 27 with a second interlayer 33, of substantially the same thickness as the interlayer bonding the outer protective layer. A seal 35 is employed with the inner lamination to prevent edge impact. Hot processing of the window in the embodiment of FIG. 5 results in mutual compensation of stresses created by the inner and outer layer to avoid or minimize bowing and/or warpage of the window while providing the benefit of maintaining both layers in compression for impact resistance. The thin inner balancing layer is easily accommodated within the structural tolerances of the window and does not affect the aerodynamic mold line. This embodiment provides a significant gain in the stiffness and operating strength of the window and enhances aerodynamics of the installation by eliminating preset bowing present in the single outer layer embodiment and reduces pressurization deflection at altitude for aerodynamic performance improvement. Additional protection from scratching, crazing, or other damage to the inner surface of the window provides a supplemental benefit.

In the present embodiments, a urethane compatible polysulfide sealant is employed to create the fairing and edge protection for the protective laminate. In the preferred embodiment, Products Research PR1829 sealant has provided satisfactory performance, and further enhances the product over conventional designs by providing protection of the machined edge to prevent in-plane cracking from transverse tensile stresses due to surface drying of moisture-swollen acrylic.

In the embodiments disclosed in the drawings the urethane interlayer is terminated short of the edge 36 of the glass outer protective layer. In demonstrated embodiments a set back, D, of approximately 0.10 inches provides a faying surface protected from weathering, deterioration and erosion of the sealant to preclude peeling. This configuration of the sealant also eliminates edge effects, such as glass chipping and interlayer peeling. In addition to creating a fairing as shown in FIG. 2 the sealant is employed in alternate embodiments to create a shim layer 36 for the sealing surface 14 on the window. As previously described for most repair processes on windows employing the knife edge structural arrangement, the sealing surface is machined to maintain proper dimensioning of the window and structure to avoid aerodynamic impact to the mold line. Extending the sealant down the edge of the sealing surface of the window as shown in FIG. 3, allows modification of the window with the present invention to achieve tolerances substantially identical to the original production window.

In a third embodiment shown in FIG. 4, the sealant configuration allows recreation of a breakout point 40 thereby avoiding remachining of the breakout point in the original acrylic window. This simplifies the machining process further enhancing the desirability of the present invention as a repair.

The present invention is equally applicable to aircraft windshields and cockpit side windows of acrylic construction. Thin sheet glass available in 0.025 inch and 0.040 inch thicknesses can be employed for such embodiments. Supplementing of the sealant fairing with a rigid metallic or plastic Z-strip such as aluminum, stainless steel or fiberglass for a clamping effect, better sealing and additional impact protection on the edges of the glass outer protective layer can be implemented particularly on aerodynamic leading edges. FIGS. 6 and 7 disclose embodiments of the invention employing various Z-strip designs. FIG. 6 shows a blended Z-strip 40 interfacing with the window structural seal 42 while FIG. 7 shows an Island Z-strip 44.

The present invention provides a replacement for current production windows and significant enhancement over prior art refurbishment techniques. The invention avoids any impact to the aerodynamic mold line and minimum weight differential, which on cabin windows of the exemplary embodiment is approximately 0.16 pounds providing an extremely attractive repair solution.

Having now described the invention as required by the patent statutes those skilled in the art will recognize modifications and substitutions to the elements of the embodiments disclosed herein. Such modifications and substitutions are within the scope of the present invention as defined in the following claims.

What is claimed is:

1. A protective laminate for aircraft windows, the laminate comprising:
   a transparent outer protective layer having a first thickness;
   a urethane interlayer having a second thickness, said urethane layer bonding said outer protective layer to an outer surface of the aircraft window, the second thickness sufficient to allow the urethane interlayer to accommodate thermal stresses arising between the outer protective layer and the aircraft window and said second thickness sufficiently thin to limit deflection of the outer protective layer for impact resistance; and
   the combined first and second thickness equal to about 0.070 inch or less.

2. A laminate as defined in claim 1 wherein the urethane interlayer terminates short of a peripheral edge of the outer protective layer and further comprising a seal extending under the peripheral edge of the outer protective layer to the urethane interlayer and extending upwardly over the peripheral edge to aerodynamically fair the edge and prevent edge impact.

3. A laminate as defined in claim 1 wherein the outer protective layer comprises chemically strengthened soda lime float glass.

4. A laminate as defined in claim 1 wherein the outer protective layer comprises highly cross-linked acrylic plastic.

5. A laminate as defined in claim 3 for an aircraft window having a sealing surface, said surface machined during repair of said window and wherein the seal extends peripherally from said edge of the outer protective layer over the sealing surface.

6. A laminate as defined in claim 3 wherein the seal is formed to recreate a breakout point.

7. A laminate as defined in claim 1 wherein lamination of the transparent outer protective layer and the urethane interlayer to the aircraft window employs a hot bonding process, said process resulting in residual stresses placing the outer protective layer in compression.

8. A laminate as defined in claim 1 further comprising:
   a transparent inner balancing layer having a third thickness substantially equal to said first thickness; and
   a second urethane interlayer having a fourth thickness substantially equal to said second thickness, said urethane layer bonding said inner balancing layer to an inner surface of the aircraft window.

9. A laminate as defined in claim 8 wherein lamination of the transparent outer protective layer and the urethane interlayer, and the transparent inner layer and second urethane interlayer to the aircraft window employs a hot bonding process, said process resulting in residual stresses placing the outer protective layer and inner balancing layer in compression.

10. A method for repair of damaged aircraft windows having an acrylic outer surface comprising steps of:
    selecting an outer protective layer having a first thickness;

selecting a urethane interlayer having a second thickness, said combined first and second thicknesses equal to about 0.070 inch or less;

machining the window surface to a depth to restore optical properties and accommodate the combined first and second thicknesses;

laminating the outer protective layer to the machined surface with the urethane interlayer; and sealing a peripheral edge of the outer protective layer with an impact resistant sealant.

* * * * *